(12) United States Patent
Sakurai et al.

(10) Patent No.: US 7,707,899 B2
(45) Date of Patent: May 4, 2010

(54) FORCE SENSOR CHIP

(75) Inventors: Nobuhiro Sakurai, Wako (JP); Takeshi Ohsato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 12/000,405

(22) Filed: Dec. 12, 2007

(65) Prior Publication Data
US 2008/0156112 A1 Jul. 3, 2008

(30) Foreign Application Priority Data
Dec. 12, 2006 (JP) .......................... P2006-334679

(51) Int. Cl.
*G01L 1/22* (2006.01)
*G01D 7/00* (2006.01)

(52) U.S. Cl. .................. 73/862.044; 73/862.041; 73/764

(58) Field of Classification Search ................ 73/862.041–862.045, 862.474, 764, 777, 73/754, 862.626, 862.621, 862.381
See application file for complete search history.

(56) References Cited

U.S. PATENT DOCUMENTS

| | | | | | |
|---|---|---|---|---|---|
| 3,985,025 | A | * | 10/1976 | Ormond | 73/862.622 |
| 4,221,134 | A | * | 9/1980 | Ekstrom, Jr. | 73/721 |
| 4,448,083 | A | * | 5/1984 | Hayashi | 73/862.042 |
| 4,454,771 | A | * | 6/1984 | Shimazoe et al. | 73/862.632 |
| 4,905,523 | A | * | 3/1990 | Okada | 73/862.044 |
| 4,921,396 | A | * | 5/1990 | Asakawa et al. | 414/751.1 |
| 5,095,762 | A | * | 3/1992 | Holm-Kennedy et al. | 73/862.041 |
| 5,207,554 | A | * | 5/1993 | Asakawa et al. | 414/744.6 |
| 5,437,196 | A | * | 8/1995 | Okada | 73/862.043 |
| 6,742,390 | B2 | * | 6/2004 | Mochida et al. | 73/504.14 |
| 6,823,744 | B2 | * | 11/2004 | Ohsato et al. | 73/862.041 |
| 6,951,142 | B2 | * | 10/2005 | Ohsato et al. | 73/862.041 |
| 7,360,456 | B2 | * | 4/2008 | Morimoto | 73/862.044 |
| 7,458,281 | B2 | * | 12/2008 | Ohsato et al. | 73/862.044 |
| 2003/0140713 | A1 | * | 7/2003 | Ohsato et al. | 73/862.041 |
| 2004/0055390 | A1 | * | 3/2004 | Hashimoto et al. | 73/777 |
| 2004/0164753 | A1 | * | 8/2004 | Hettori et al. | 324/725 |
| 2004/0255697 | A1 | * | 12/2004 | Okada | 73/862.043 |
| 2005/0081645 | A1 | * | 4/2005 | Ohsato et al. | 73/862.041 |
| 2006/0086190 | A1 | * | 4/2006 | Ohsato et al. | 73/764 |
| 2006/0130596 | A1 | * | 6/2006 | Wilner | 73/862.627 |
| 2006/0174718 | A1 | * | 8/2006 | Morimoto | 73/862.044 |
| 2007/0000335 | A1 | * | 1/2007 | Morimoto | 73/862.045 |

FOREIGN PATENT DOCUMENTS

JP 2000-267802 A 9/2000
JP 2006-125873 A 5/2006

* cited by examiner

*Primary Examiner*—Lisa M Caputo
*Assistant Examiner*—Jonathan Dunlap
(74) *Attorney, Agent, or Firm*—Birch, Stewart, Kolasch, & Birch LLP

(57) ABSTRACT

A force sensor chip including a semiconductor substrate having a plurality of strain resistance elements and temperature-compensating resistance elements corresponding to the resistance elements is disclosed. The structure in the periphery of parts where the strain resistance elements, which are provided to deforming parts in the action part formed on the semiconductor substrate, are disposed is the same as the structure in the periphery of parts where the temperature-compensating resistance elements in the action part are disposed.

6 Claims, 5 Drawing Sheets

FORCE SENSOR CHIP

FIELD OF THE INVENTION

The present invention relates generally to a force sensor chip and, more particularly, to a force sensor chip that has strain resistance elements formed on a semiconductor substrate using a semiconductor manufacturing process technique, and is used as a force sensor in a machine tool, pointing device or the like.

BACKGROUND OF THE INVENTION

In machine tools and other automated machinery, the work operation involves a force being applied to an object that is to be worked, or a force being received from an external source. In such cases, automated machines require that the moment and external force applied thereto be detected, and a control corresponding to the force and moment be carried out. The external force and moment must be accurately detected in order to carry out the control corresponding to the force and moment with high accuracy.

In view of this, a variety of force sensors have been proposed in the past. Using the detection method as a basis, the force sensors are normally classified into elastic force sensors and balanced force sensors. The elastic force sensor measures force on the basis of the amount of deformation in proportion to the external force. The balanced force sensor measures force according to a balance with a known force.

The theoretical structure of another known force sensor involves a plurality of strain resistance elements being provided to a portion of a load cell, which elastically deforms in response to an external force. When an external force is applied to the load cell of the force sensor, electric signals according to the degree of deformation (stress) of the load cell are outputted from the plurality of stress resistance elements. The force of two or more components or the like applied to the load cell can be detected on the basis of these electric signals. The measurement of stress generated in the force sensor is calculated on the basis of the electric signals described above.

A six-axis force sensor is one known type of force sensor. The six-axis force sensor, which is a type of elastic force sensor, has a plurality of strain resistance elements provided to a load cell portion. The six-axis force sensor detects an external force as six axis components, which are divided into stress components (force: Fx, Fy, Fz) in the direction of the three axes (X axis, Y axis, and Z axis) of a Cartesian coordinate system; and torque components (moment: Mx, My, Mz) in the direction of the axes.

Japanese Patent Application Laid-Open Publication No. 2006-125873 (JP 2006-125873 A) discloses a multi-axis force sensor chip and a multi-axis force sensor assembled using this chip.

In the multi-axis sensor chip, a semiconductor manufacturing technique is used to form a plurality of strain resistance elements on a connecting part of a semiconductor substrate (base member) having a prescribed shape and structure. The strain resistance elements is affected by the stress generated in response to the force or moment applied to an operating part of the semiconductor substrate, and the resistance values change. The force or moment applied to the operating part of the semiconductor substrate is calculated by appropriately combining the resistance values of the plurality of strain resistance elements.

In the multi-axis sensor disclosed in JP 2006-125873 A, temperature-compensating resistance elements are provided correspondingly with respect to the plurality of strain resistance elements. The variation characteristics of the resistance values of the strain resistance elements are inherently temperature-dependent, and the corresponding temperature-compensating resistance elements and the stress resistance elements are therefore equally affected by temperature.

A thick film circuit board for a pointing stick is disclosed in Japanese Patent Application Laid-Open Publication No. 2000-267802 (JP 2000-267802 A). A pointing stick is a component used as a signal input device in a notebook computer or the like. A signal input operation is carried out by manipulating a pointing stick in the x, y, and z directions using finger pressure. When a finger manipulates the pillar-shaped body that constitutes the stick, a lower end part of the pillar-shaped body applies a force or moment to a center part (force action point) of the thick film circuit board. When the thick film circuit board deforms, the resistance values of the plurality of resistance bodies on the thick film circuit board are varied, and an input signal is generated. According to the thick film circuit board, four resistance elements are disposed in a point-symmetrical positional relationship around the force action point in order to provide a satisfactory output balance among the axes.

According to the multi-axis force sensor chip disclosed in JP 2006-125873 A, the temperature-compensating resistance elements are provided to locations such that the distance to the locations where the strain resistance elements are disposed (which are regions where the semiconductor substrate does not deform) can be reduced to the greatest extent possible; and such that the temperature conditions can be made equal. This is performed in order to remove the effect of the temperature on the temperature-dependent strain resistance elements. It is thereby possible to compensate for the temperature with high accuracy.

However, even when the temperature-compensating resistance elements are provided to locations where the temperature conditions are the same as those where the strain resistance elements are disposed (non-deforming regions), the initial resistance values (resistance values when no load is present) of the strain resistance elements will actually be irregular. As a result, a problem occurs in that optimal values will not necessarily be obtained even when the temperature-compensating resistance elements are used to perform temperature compensation on the output values of the strain resistance elements.

In the multi-axis force sensor chip, it is desirable for the outputs across the axes to be properly balanced, and a proposal for achieving such a result is disclosed in, e.g., JP 2000-267802 A. However, the structure of the thick film circuit board disclosed in JP 2000-267802 A corresponds to a ceramic substrate. In the case of a semiconductor substrate, the crystal orientation in the semiconductor substrate must be taken into consideration in order to equalize the output resistance values across the axes.

Furthermore, as mentioned in JP 2006-125873 A as well, the temperature-compensating resistance elements are disposed with consideration given to crystal orientation so that the strain sensitivity of the strain resistance elements is considerably higher than the strain sensitivity of the temperature-compensating resistance elements. However, this document does not disclose the concept of determining the layout of the resistance elements in consideration of the crystal orientation from the standpoint of properly balancing the outputs across the axes.

SUMMARY OF THE INVENTION

An object of the present invention is to provide a force sensor chip in which the temperature-compensating resistance elements are subjected to the same level of heat-related effects as the strain resistance elements; are not affected by stress from externally applied forces; and are able to have heat transfer characteristics (substrate radiation properties) that are of the same level as where the strain resistance elements are disposed. Temperature compensation can be performed with high accuracy, and stress can be detected with high accuracy.

Another object of the present invention is to provide a force sensor chip in which the initial resistance values of the strain resistance elements can be optimized in consideration of the crystal orientation of the semiconductor substrate, the outputs across the axes can be properly balanced, and stress can be detected with high accuracy.

According to a first aspect of the present invention, there is provided a force sensor chip comprising: a base member having an action part that has an external force action region and non-deforming regions, a support part for supporting the action part, and connecting parts for connecting the action part and the support part, the connecting parts having deformation occurring parts; strain resistance elements provided to the deformation occurring parts of the connecting parts; and temperature-compensating resistance elements provided to the non-deforming regions of the action part, wherein a peripheral part of the deformation-occurring parts where the strain resistance elements are disposed has a same structure as that of a peripheral part of the non-deforming regions where the temperature-compensating resistance elements are disposed.

In the force sensor chip described above, the temperature-compensating resistance elements for performing temperature compensation for the stress detection strain resistance elements are provided to the non-deforming regions of the action part that receives external force. The structure in the periphery of the locations where the strain resistance elements are disposed is designed so as to be the same as the structure in the periphery of the locations where the temperature-compensating resistance elements are disposed. As a consequence thereof, the resistance values change merely from the effect of the temperature based on the same temperature conditions as those of the strain resistance elements, and not from the effect of stress caused by external force. Therefore, temperature compensation can be carried out for the strain resistance elements with high accuracy, and stress can be detected by the strain resistance elements with high accuracy.

In a preferred form, the structure of the peripheral part of the deformation-occurring parts where the strain resistance elements are disposed has same temperature characteristics as those of the structure of the peripheral part of the non-deforming regions where the temperature-compensating resistance elements are disposed.

Preferably, the action part, the support part, and the connecting parts of the base member are made by forming a plurality of predetermined holes in the base member, and holes having a same shape and a same orientation as the predetermined holes formed in a periphery of the strain resistance elements are formed in a periphery of the temperature-compensating resistance elements.

Desirably, the action part, the support part, and the connecting parts of the base member are made by forming a plurality of predetermined holes in the base member, and holes having a same shape and an opposite orientation as the predetermined holes formed in a periphery of the strain resistance elements are formed in a periphery of the temperature-compensating resistance elements.

The positional relationship and distance between the strain resistance elements and the holes in the periphery thereof are preferably identical to those between the temperature-compensating resistance elements and the holes in the periphery thereof.

It is desirable that the resistance value of a wiring of the strain resistance elements and the resistance value of a wiring of the temperature-compensating resistance elements be adjusted such that the resistance values relating to the strain resistance elements and the resistance values relating to the temperature-compensating resistance elements are preferably harmonized.

In the force sensor chip thus arranged, the temperature-compensating resistance elements are placed in the vicinity of the strain resistance elements, and both are readily affected by the temperature to a similar degree. Moreover, since the structure in the periphery of the locations where the strain resistance elements are disposed is the same as the structure in the periphery of the locations where the temperature-compensating resistance elements are disposed, the structure in the periphery of the locations where the temperature-compensating resistance elements are disposed will not deform under the stress caused by external forces, and can be subjected to the effect caused by heat emitted from the semiconductor plate (temperature effect) to the same degree as the strain resistance element. Furthermore, the temperature-compensating resistance elements and the strain resistance elements will also be equally subjected to the effect caused by microdeformation of the substrate due to the effect of the heat, thereby allowing high-accuracy temperature compensation to be performed, and allowing the strain resistance elements to be able to output accurate detection values corresponding only to stress. The force sensor chip of the present invention can thereby detect stress with a very high degree of accuracy.

"Structures in the periphery of the locations in which the strain resistance elements and the temperature-compensating resistance elements are disposed" indicates the locations in which the elements are disposed, the structure of the substrate around these locations (relating, inter alia, to the manner in which the holes are formed), and the laminar structure of the substrate. Since holes are formed around the strain resistance elements, the effect described above can be obtained by forming similar holes around the temperature-compensating resistance elements.

According to a second aspect of the present invention, there is provided a force sensor chip which comprises: a base member having: an action part that has an external force action region and non-deforming regions; a support part for supporting the action region; and connecting parts for connecting the action part and the support part; and strain resistance elements provided to a part of the connecting part where deformation occurs, wherein the base member comprises a semiconductor substrate having crystal orientation, and initial resistance values of the strain resistance elements formed on the base member are set to different values in consideration of the crystal orientation in accordance with each of two perpendicular axes on a surface of the base member.

Preferably, the initial resistance values of the strain resistance elements are determined by adjusting any one of the length dimension, width dimension, or depth dimension of the strain resistance elements, or the carrier concentration in the surface of the base member.

In the force sensor chip according to the second aspect, the base member is thus formed using a semiconductor substrate having a crystal orientation, and the initial resistance values of the plurality of strain resistance elements formed on the base member are set to different values in consideration of the crystal orientation in accordance with each of two perpendicular axes on the surface of the base member. Therefore, the initial resistance values of the strain resistance elements (which may include the temperature-compensating resistance elements) are optimized the output across the axes can be satisfactorily balanced, and stress can be detected with high accuracy.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

A typical embodiment of a force sensor chip according to the present invention will be described with reference to FIGS. 1 through 5. In this embodiment, a six-axis force sensor chip is given as an example of a force sensor chip. The force sensor chip of the present invention is not limited to a six-axis force sensor chip.

Figure 1:
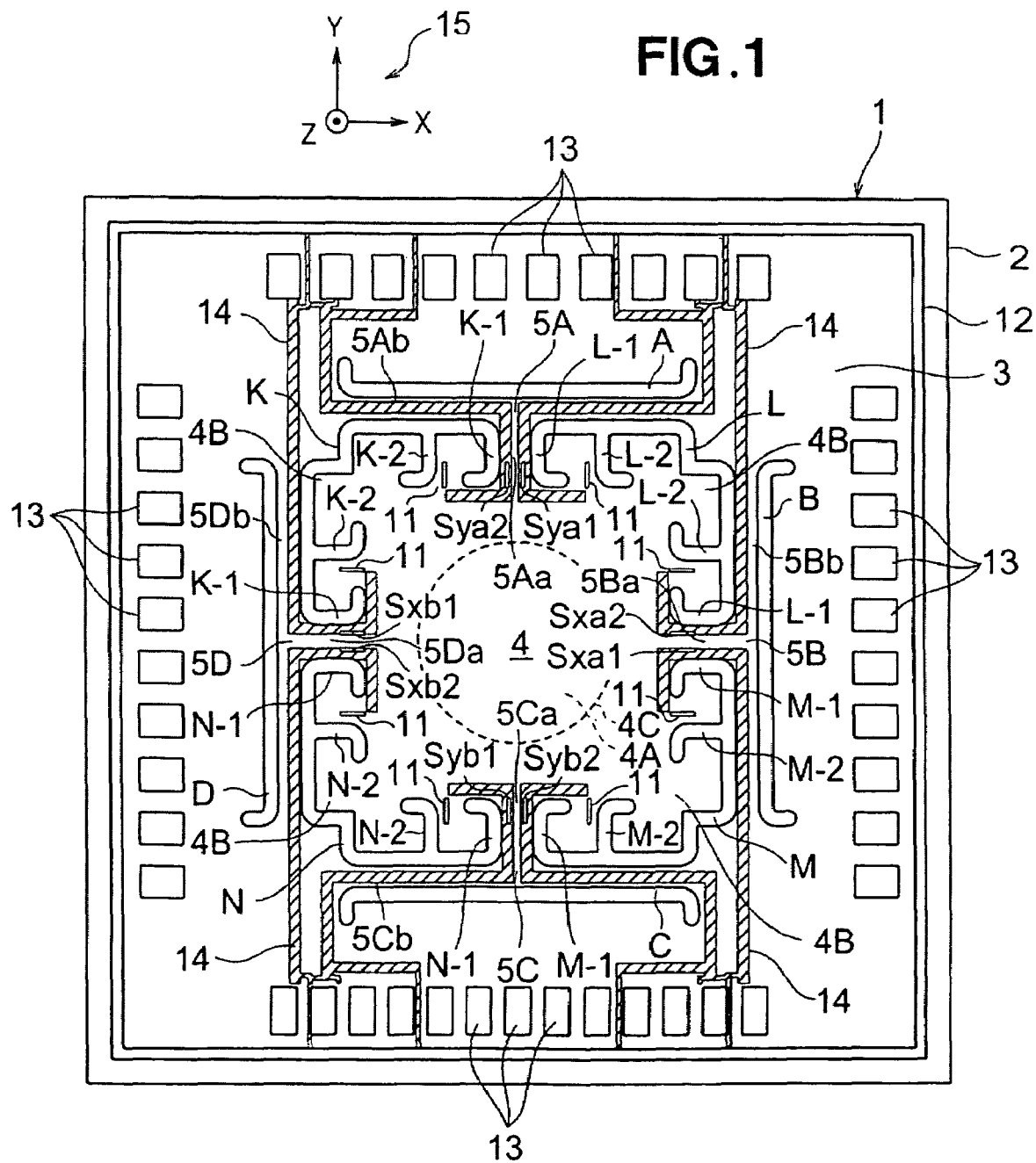
FIG. 1 is a top plan view showing a six-axis force sensor chip which is a typical example embodiment of a force sensor chip according to the present invention.

In FIG. 1, a six-axis force sensor chip 1 of the present embodiment is formed by a semiconductor substrate 2 that preferably has a square shape as viewed from above. The length of one side of the square semiconductor substrate 2 is, e.g., 5.5 mm. The substrate is not limited to a semiconductor substrate. The entirety of the six-axis force sensor chip 1 assumes the shape of a plate based on the semiconductor substrate 2.

When a semiconductor device is formed on the substrate 2, the six-axis force sensor chip 1 is preferably manufactured by forming holes and wires using a semiconductor manufacturing process technique (e.g., photolithography, ion implantation, P-CVD, sputtering, and RIE) on one surface.

The six-axis force sensor chip 1 of the present embodiment is thus formed as a semiconductor sensor device.

In the six-axis force sensor chip 1, the part functioning as a six-axis sensor for detecting six axial components is formed using, e.g., eight strain resistance elements (or piezo resistance elements; referred to below as "resistance elements," which refers to strain resistance elements) Sxa1, Sxa2, Sxb1, Sxb2, Sya1, Sya2, Syb1, Syb2 that comprise an active layer (or a thermal diffusion layer) formed by implanting ions in one surface of the semiconductor substrate 2. All of the eight resistance elements are divided into groups of two (Sxa1, Sxa2), (Sxb1, Sxb2), (Sya1, Sya2), (Syb1, Syb2), and disposed along the proximity of the boundary line formed with action parts 4 in four substantially T-shaped connecting parts 5A through 5D, which are described below.

In the six-axis force sensor chip 1, temperature-compensating resistance elements 11 comprising an active layer (thermal diffusion layer) similar to the active layer described above are individually formed in correspondence to the eight resistance elements. Eight temperature-compensating resistance elements 11 are formed in all. The eight temperature-compensating resistance elements 11 are disposed in four non-deforming regions in the action part 4 described below.

As shown in FIG. 1, eight holes A, B, C, D, K, L, M, N are formed through the semiconductor substrate 2 in the thickness direction of the plate member. The six-axis force sensor chip 1 is separated into a plurality of regions by the eight holes A, B, C, D, K, L, M, N according to function.

The holes A, B, C, D, K, L, M, N all have a slit shape that is relatively narrow. The holes A, B, C, D have a substantially linear slit shape, and the holes K, L, M, N have a substantially L-shaped slit shape.

The end parts of the linear-shaped through-holes A, B, C, and D are bent in a curved shape toward the exterior. The end parts of the substantially L-shaped through-holes K, L, M, N have bent parts K-1, L-1, M-1, N-1 that bend in a curved shape toward the interior.

In the substantially L-shaped through-holes K, L, M, N, slit-shaped hole parts K-2, L-2, M-2, N-2 are formed so as to have the same shape and to be bent in the same direction as the bent parts K-1, L-1, M-1 N-1 of the end parts. The hole parts K-2, L-2, M-2, N-2 are substantially parallel to the corresponding bent parts K-1, L-1, M-1, N-1, and have a positional relationship therewith over a fixed distance.

As described above, forming the eight through-holes A, B, C, D, K, L, M, N makes it possible for the semiconductor substrate 2 that constitutes the six-axis force sensor chip 1 to comprise an action part 4 that has a planar shape that resembles a square and that is positioned in the center portion; a substantially square ring-shaped support part 3 that is positioned so as to surround the action part 4; and four substantially T-shaped connecting parts 5A, 5B, 5C, 5D that are positioned between the action part 4 and the support part 3 and connect the action part and the support part in correspondence with the four edge portions thereof.

The holes K, L, M, N are formed in the semiconductor substrate 2, whereby the action part 4 is formed. The holes A, B, C, D, K, L, M, N are formed in the semiconductor substrate 2, whereby the four substantially T-shaped connecting parts 5A, 5B, 5C, 5D are formed between the holes A, B, C, D and the holes K, L, M, N.

The four connecting parts 5A through 5D are substantially T-shaped beams, and have a bridge part 5Aa and an elastic part 5Ab, a bridge part 5Ba and an elastic part 5Bb, a bridge part 5Ca and elastic 5Cb, and a bridge part 5Da and an elastic part 5Db.

The bridge parts 5Aa, 5Ba, 5Ca, 5Da of the connecting parts 5A through 5D are formed between the bent parts K-1, L-1, M-1, N-1 of the end parts of the holes K, L, M, N described above. Specifically, the bridge part 5Aa is formed between the bent parts K-1 and L-1. The bridge part 5Ba is formed between the bent parts L-1 and M-1. The bridge part 5Ca is formed between the bent parts M-1 and N-1. The bridge part 5Da is formed between bent parts N-1 and K-1.

The support part 3 is a component supported from a bottom surface using a support seat, e.g., when incorporated in a six-axis force sensor unit.

The action part 4 is a portion for directly receiving action from an external force or load (referred to as "external force"

below) when the external force is transmitted from the exterior via a connecting rod or the like. The action part 4 is ordinarily configured so as to receive the external force in the center part.

The connecting parts 5A, 5B, 5C, 5D undergo dramatic deformation and positional variance when the action part 4 is subjected to an external force and undergoes deformation and positional variation. The parts 5A through D are the components (load cells) that undergo the greatest level of stress among the fixed parts, action parts, connecting parts, and other parts.

The strain resistance elements are formed on the surface parts of the connecting parts 5A, 5B, 5C, 5D, which are load cells. The locations in which the strain resistance elements are disposed on the connecting parts 5A, 5B, 5C, 5D are not necessarily limited to the locations in which the maximum level of stress is generated in the connecting parts. The strain resistance elements are disposed in an optimal position with consideration given to the formation process, the wiring route, and a variety of other contributing factors.

The action part 4 is formed from a center part to which external force is applied or inputted (external force action region) 4A, and four angle parts 4B corresponding to the four corners positioned around the center part 4A.

The circle 4C shown by the dashed line is a connecting region connected to a connecting rod for transmitting an external force or the like. The circle 4C has diameter of, e.g., 1.6 mm. The outside edge parts of the four angle parts 4B on the action part 4 are formed as free ends by the holes K, L, N, M. Therefore, the regions in the vicinity of the free ends of the four angle parts 4B are non-deforming regions that do not deform even when external force is applied to the center part 4A. As described above, the slit-shaped holes K-2, L-2, M-2, N-2 added to the holes K, L, N, M are formed in the four corner parts 4B, which are non-deforming regions.

The elastic parts 5Ab, 5Bb, 5Cb, 5Db of the connecting parts 5A through 5D are connected at the ends of the supporting part 3 in the longitudinal direction thereof in the inner regions of the holes A, B, C, D. One of the end parts (inner end parts) in the longitudinal direction of the bridge parts 5Aa, 5Ba, 5Ca, 5Da of the connection parts 5A through 5D is connected to a portion corresponding to an edge of the action part 4, and the other end parts (outer end parts) are connected to the corresponding elastic members. The connecting part comprising the bridge parts and the elastic parts, the connection portions between the connecting part and the action part, and the connection portions between the connecting part and the supporting part are integrally formed with the semiconductor substrate 2.

The bridge parts 5Aa, 5Ba, 5Ca, 5Da; the elastic parts 5Ab, 5Bb, 5Cb, 5Db; and the connected parts of the action part 4 are preferably worked into an arcuate shape in order to disperse stress generated by the external force applied to the action part 4, and to provide strength against the applied external force.

In FIG. 1, the resistance elements Sya1, Sya2 are, for example, formed in the connection parts 5A, in the vicinity of the connected part between the action part 4 and the bridge part 5Aa. Specifically, since stress corresponding to external force applied to the action part 4 is generated in the surface of the connecting part 5A, the resistance elements Sya1, Sya2 are formed so as to be disposed in the portion in which a considerable amount of strain occurs (load cells).

Furthermore, the resistance elements Sya1, Sya2 are formed along the transverse direction of the bridge part 5Aa and so that the longitudinal directions thereof are parallel to the longitudinal direction of the bridge part 5Aa. The distance between the rim of the end part L-1 of the hole L and the resistance element Sya1, and the distance between the rim of the end part K-1 of the hole K and the resistance element Syb2, are designed to be equal.

The temperature-compensating resistance element 11 corresponding to the resistance element Sya1 is formed at a prescribed position in the vicinity of the hole part L-2 corresponding to the end part L-1 of the hole L. The structure in the periphery of the location where the resistance element Sya1 corresponding to the end part L-1 is disposed is the same as the structure in the periphery of the location where the temperature-compensating resistance element 11 corresponding to the hole part L-2 is disposed. Specifically, the structure in the periphery of the location where the resistance element Sya1 is disposed is the same as the structure in the periphery of the location where the corresponding temperature-compensating resistance element 11 is disposed.

Similarly, the temperature-compensating resistance element 11 corresponding to the resistance element Sya2 is formed in a prescribed position in the vicinity of the hole part K-2 corresponding to the edge part K-1 of the hole K. The structure in the periphery of the location where the resistance element Sya2 corresponding to the end part K-1 is disposed is the same as the structure in the periphery of the location where the temperature-compensating resistance element 11 corresponding to the hole part K-2 is disposed. Specifically, the structure in the periphery of the location where the resistance element Sya2 is disposed is the same as the structure in the periphery of the location where the corresponding temperature-compensating resistance element 11 is disposed.

The other resistance elements Syb1, Syb2, resistance elements Sxa1, Sxa2, and resistance elements Sxb1, Sxb2, as with the resistance elements Sya1, Sya2 described above, are formed so as to be disposed in the vicinity of the connecting part of the action part 4 and the bridge part 5Ca, the vicinity of the connecting part of the action part 4 and the bridge part 5Ba, and the vicinity of the connecting part of the action part 4 and the bridge part 5Da, respectively. Furthermore, the fact that the structures in the periphery of the locations where the resistance elements Syb1, Syb2, Sxa1, Sxa2, Sxb1, Sxb2 are disposed are the same as the structures in the periphery of the locations where the thermal-compensating resistance elements 11 corresponding to the resistance elements are disposed is reflected in the corresponding bent parts K-1, L-1, M-1, N-1 and the hole parts K-2, L-2, M-2, N-2.

The peripheral edge of the semiconductor substrate 2 has GND (ground) wiring 12 formed in a substantially square ring shape in the requisite width along the sides. The GND wiring 12 is in contact with the requisite number of GND electrode pads.

Ten signal electrode pads 13 are formed along the edges of the semiconductor substrate 2. A plurality of shaded areas 14 indicates an electrical wiring pattern. In practice, the wiring pattern 14 is formed using a plurality of interconnections.

Figure 4:
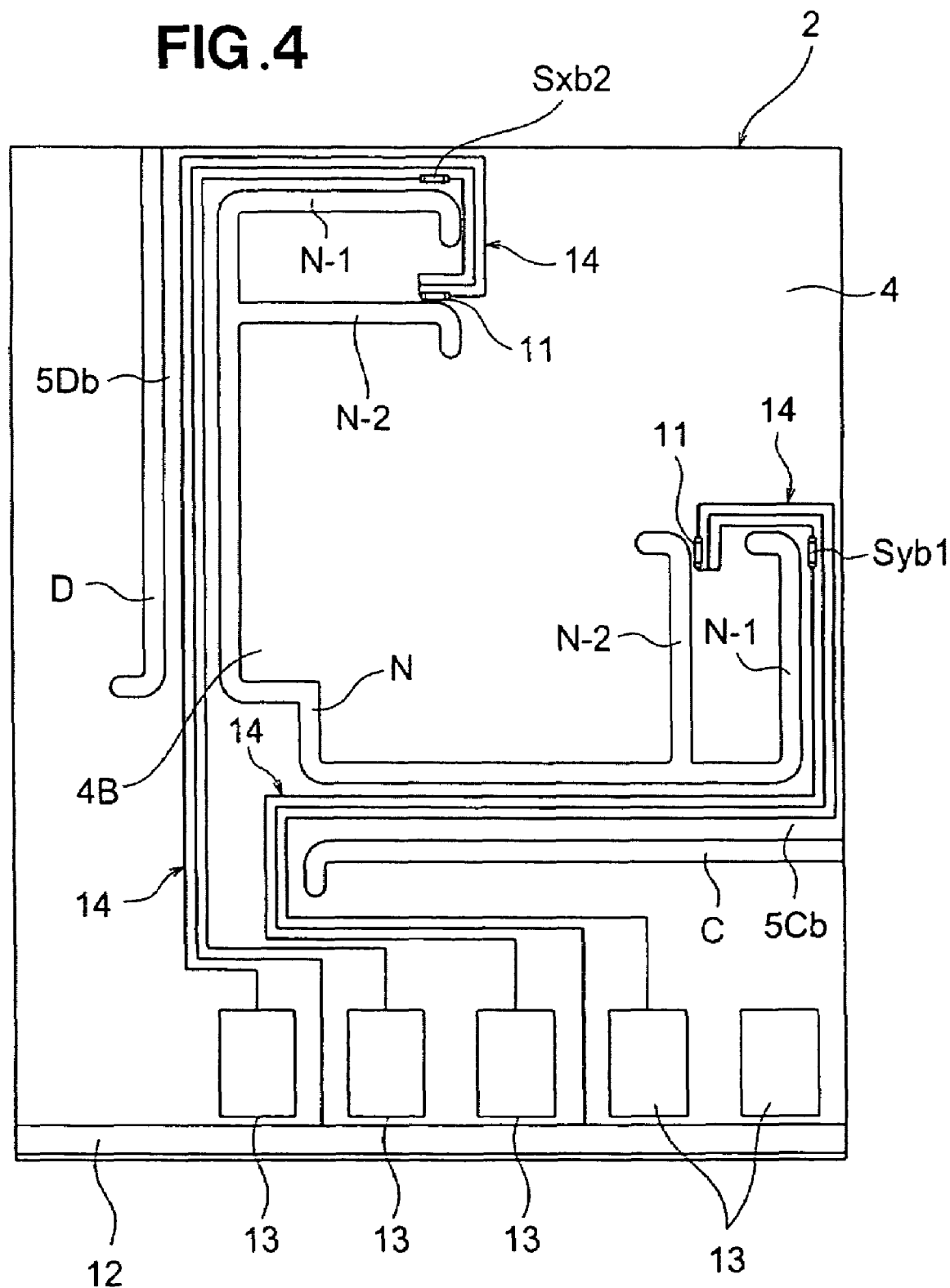
FIG. 4 is a partial circuit diagram showing a part of a wiring example of a wiring pattern formed on a semi-conductor substrate.

A specific example of the wiring in a portion of the wiring pattern 14 is shown in FIG. 4. FIG. 4 shows the specific wiring structure of the wiring pattern 14 relating to the resistance elements Syb1, Sxb2 in the corner parts 4B in the peripheral part of the hole N and the temperature-compensating resistance elements 11 corresponding thereto. In FIG. 4, elements that are the same as elements shown in FIG. 1 are indicated by the same symbols.

As shown by the numerical symbol 15 in FIG. 1, a three-axis Cartesian coordinate system having an X axis, a Y axis, and a Z axis is defined in the semiconductor substrate 2 configured from the action part, connecting parts, the strain resistance elements, the temperature-compensating elements, the plurality of electrodes, the wiring pattern, and the like which are formed on the basis of the hole structure.

A description made with reference to FIG. 2 shall be provided below for the wiring pattern 14; the structures in the periphery of the locations in which the strain resistance elements and the temperature-compensating resistance elements are disposed; and the positional relationship of one strain resistance element (e.g., Syb1) and one temperature-compensating resistance element 11.

Figure 2:
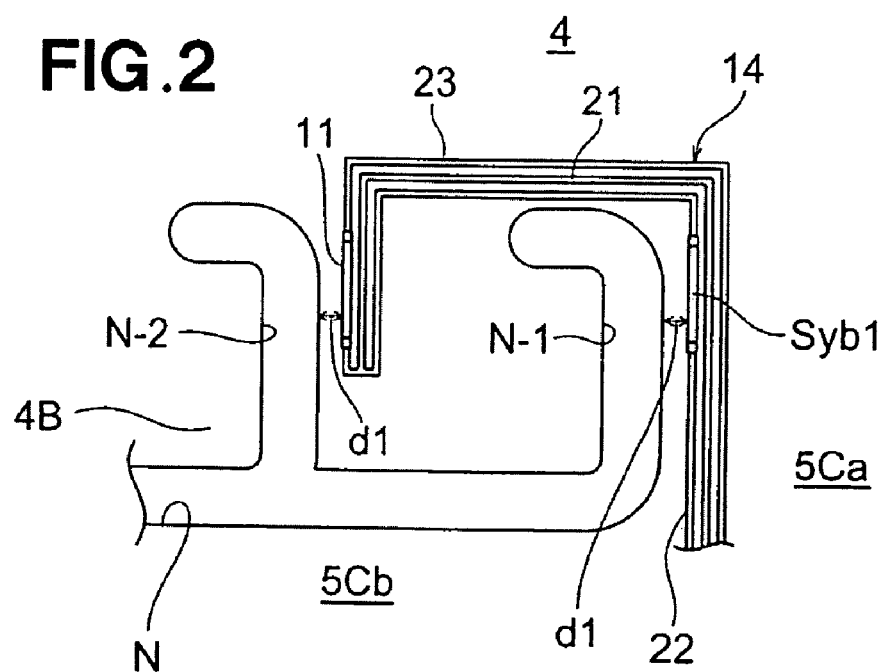
FIG. 2 is an enlarged plan view showing a part of the six-axis force sensor chip of FIG. 1.

FIG. 2 is an enlarged portion of the semiconductor substrate 2 in FIG. 1, showing the end part N-1 and the hole part N-2 of the hole N, the resistance element Syb1 disposed in the vicinity thereof, and the temperature-compensating resistance element 11 corresponding thereto.

FIG. 2 shows the bent part N-1 of one end part of the resistance element Syb1 of the hole N, and the hole part N-2 formed in the vicinity of the bent part N-1.

The bent part N-1 and the hole part N-2 have the same dimensions and the same shape, and are formed so as to face the same direction as the bent shape.

The location where the resistance element Syb1 corresponding to the bent part N-1 is disposed is the same as the location where the temperature-compensating resistance element 11 corresponding to the hole part N-2 is disposed. Specifically, the distance d1 between the edge of the hole and the position of the resistance element Syb1 corresponding to the bent part N-1 is equal to the distance d1 between the edge of the hole and the position of the temperature-compensating resistance element 11 corresponding to the hole part N-2.

The distance between the resistance element Syb1 disposed on the bridge part 5Ca of the connecting part 5 (FIG. 1) and the temperature-compensating resistance element 11 disposed on the corner part 4B of the action part 4 is designed so as to be as small as possible. Consequently, the structure in the periphery of the location where the resistance element Syb1 is disposed is the same as the structure in the periphery of the location where the temperature-compensating resistance element 11 is disposed. As a result, the resistance element Syb1 and the temperature-compensating resistance element 11 will have the same temperature conditions and heat transfer conditions, or temperature characteristics such as the effect of strain generated by micro-deformation of the substrate by heat.

The phrase "the same temperature conditions" means that they have the same temperature environment, and receive an equal heat effect. The phrase, "the same heat transfer conditions" means that they experience the same change in temperature on the basis of the manner in which heat is transferred, and have equivalent heat transfer amount characteristics.

According to the shape and structure of the semiconductor substrate 2 of the present embodiment, the bent part N-1 and the hole part N-2 of the hole N have the same shape and dimensions. Therefore, the heat transfer conditions (radiation properties or the like) caused by air flowing through these holes will be the same.

The structure formed by the resistance element Syb1 as described with reference to FIG. 2, the temperature-compensating resistance element 11 corresponding thereto, the bent part N-1, and the hole part N-2 are used similarly in the other seven resistance elements Sxa1, Sxa2, Sxb1, Sxb2, Sya1, Sya2, and Syb2 as well.

Figure 3:
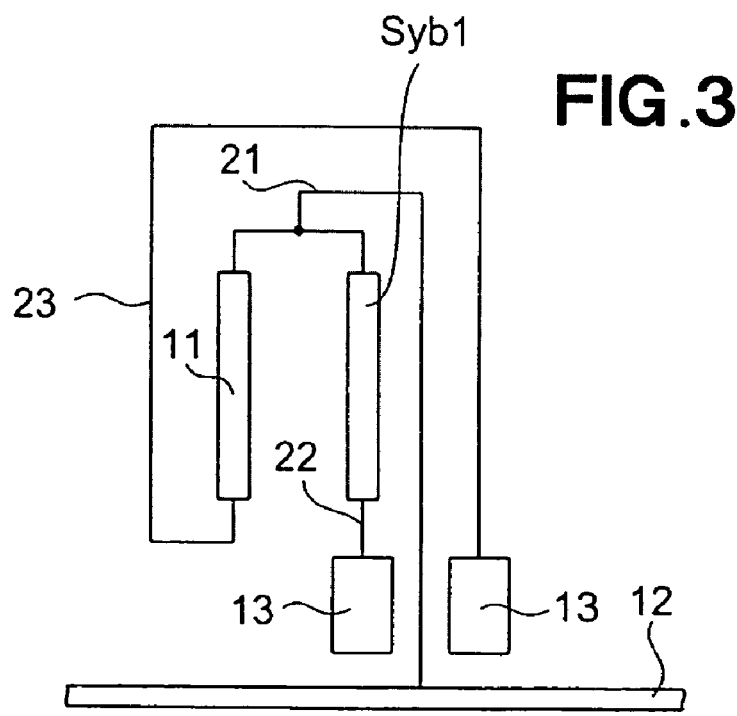
FIG. 3 is an electric circuit diagram showing an electric wiring relating to one strain resistance element and one temperature-compensating resistance element.

A description is provided hereunder with reference to FIG. 3 in regard to the relationship of the electrical connection formed by the wiring pattern 14 between the resistance element Syb1 and the temperature-compensating resistance element 11.

The temperature-compensating resistance element 11 and the resistance element Syb1 are formed by a wiring structure that forms a half circuit (half bridge) of a bridge circuit. The connection point between the resistance element Syb1 and the temperature-compensating resistance element 11 is connected to the GND wiring 12 via the signal wiring 21. The other end of the resistance element Syb1 is connected to a signal electrode pad 13 via the signal wiring 22. The other end of the temperature-compensating resistance element 11 is connected to a signal electrode pad 13 via signal wiring 23.

According to the electrical wiring structure shown in FIG. 2 and FIG. 3, the signal wiring 23 of the temperature-compensating resistance element 11 is inevitably longer than signal wiring 22 of the resistance element Syb1. The initial resistance values that result from the difference in the lengths of the signal wiring 23 and the signal wiring 22 can be adjusted by appropriately changing the wiring length ratio, the width ratio, the thickness ratio, or other parameters. The initial resistance values of the strain resistance elements and the temperature-compensating resistance element can thus be harmonized.

Figure 5:
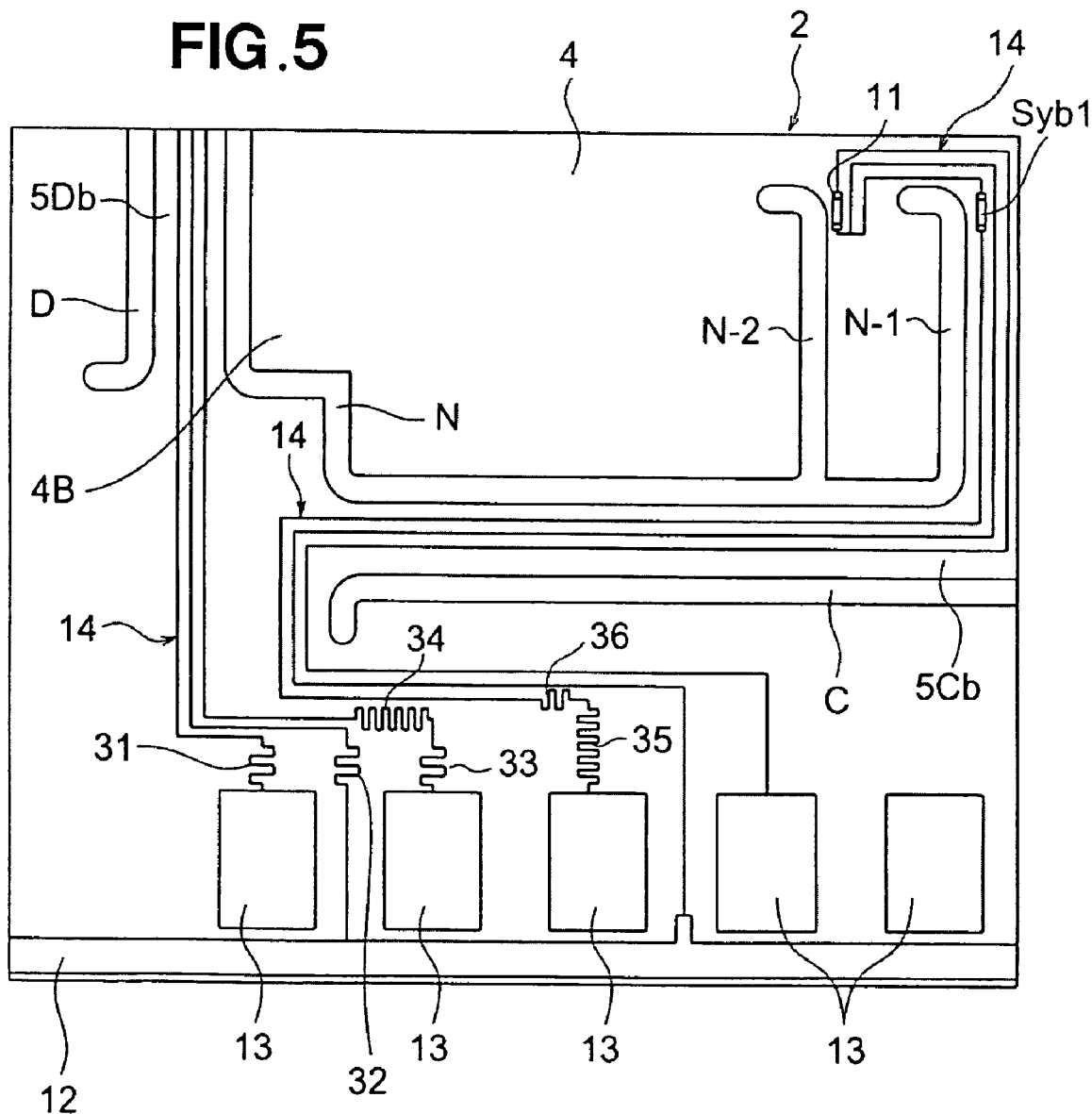
FIG. 5 is a partial circuit diagram showing an example wiring pattern designed for adjusting a wiring resistance of the wiring pattern.

An example of the adjusting of the wiring resistance values described above is shown in FIG. 5. FIG. 5 shows a specific wiring structure for adjusting the resistance values of the wiring pattern 14 in relation to the resistance elements Syb1, Sxb2 of the corner parts 4B in the peripheral part of the hole N, and the temperature-compensating resistance elements 11 corresponding to the resistance elements Syb1, Sxb2. In FIG. 5, elements that are the same as those shown in FIG. 1 have the same symbols. In the wiring structure, the wiring pattern 14 is provided with portions 31, 32, 33, 34, 35, 36 for appropriately adjusting the resistance values according to the wiring length. The adjusting is performed so that the resistance value of the wiring related to the strain resistance elements will be the same as the resistance value of the wiring related to the temperature-compensating resistance elements.

The wiring structure shown in FIG. 3, which relates to the resistance element Syb1 and the temperature-compensating resistance element 11, is also used in the other seven resistance elements Sxa1, Sxa2, Sxb1, Sxb2, Sya1, Sya2, Syb2.

In the six-axis force sensor chip 1, the structures in the periphery of the locations where the strain resistance elements and the temperature-compensating resistance element corresponding thereto are disposed are designed so as to be the same. As a result, it is possible to reduce the difference between the initial resistance values of the strain resistance elements and the temperature-compensating resistance elements corresponding thereto; to reduce the difference between chips caused by variations in the initial resistance values, thereby improving chip reproducibility; and to carry out temperature compensation with high accuracy, resulting in high-accuracy stress-detecting performance.

Figure 6:
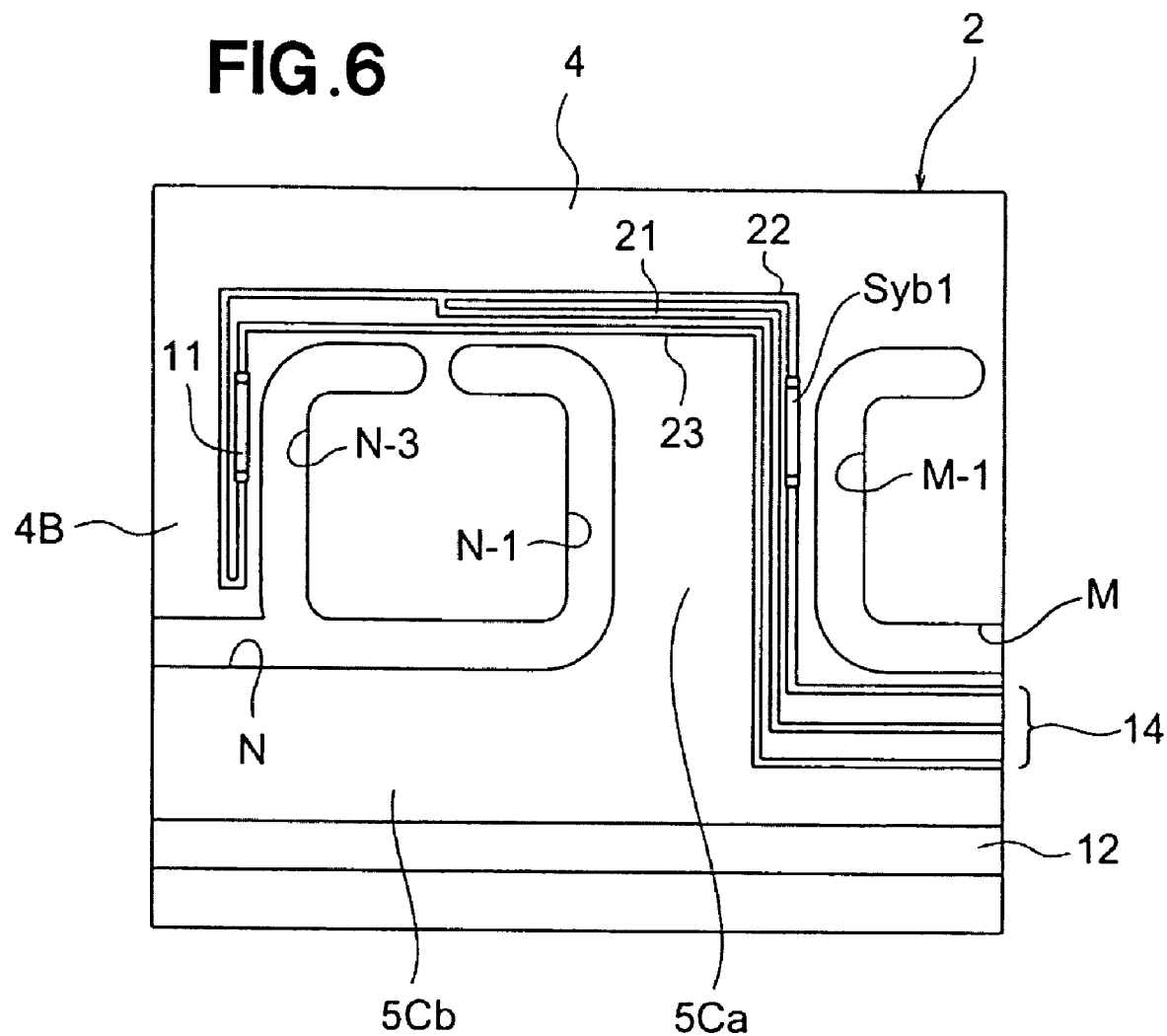
FIG. 6 is a view, corresponding to FIG. 2, showing another embodiment of the six-axis force sensor chip.

A six-axis force sensor chip of another embodiment will be described below with reference to FIG. 6. FIG. 6 is similar to FIG. 2. Elements in FIG. 6 that are substantially the same as those described in FIG. 2 have the same symbols, and a description thereof is omitted. In the six-axis force sensor chip 1 of this embodiment, a hole part N-3 is formed near the bent part N-1 of the end part of the hole N, instead of the hole part N-2 described above. The hole part N-3 has the same shape and dimensions of the bent part N-1, but is oriented in the opposite direction. The shape and dimensions of the hole part N-3 are the same as the shape and dimensions of the bent part M-1 of the hole M immediately to the right, and the directions thereof are the same.

As shown in FIG. 6, the resistance element Syb1 is disposed in close proximity to the bent part M-1 of the hole M, and the temperature-compensating resistance element 11 is disposed in close proximity to the hole part N-3. In this case, the structure in the periphery of the location where the resistance element Syb1 is disposed is exactly the same as the structure in the location where the temperature-compensating resistance element 11 is disposed.

As described above, Forming the structures in the peripheries of the locations where the resistance element Syb1 and the temperature-compensating resistance element 11 makes it possible to harmonize the temperature conditions and the heat transfer conditions of the resistance element Syb1 and the temperature-compensating resistance element 11, and to achieve the same effects as in the embodiment described above.

The following is a description of another embodiment of the present invention oriented toward improving the balance in output over the axes of the six-axis force sensor chip 1.

The base member of the six-axis force sensor chip 1 described above is a semiconductor substrate 2. The semiconductor substrate 2 has a crystal orientation; therefore, when a strain resistance element or temperature-compensating resistance element formed in the X-axis direction is given the same shape as a strain resistance element or the like formed in the Y-axis direction irrespectively of the crystal orientation, e.g., as shown in FIG. 1, a difference will arise between the initial resistance value of the strain resistance element or the like in the X-axis direction and the initial resistance value of the strain resistance element or the like in the Y-axis direction.

Accordingly, at least the strain resistance elements in the X-axis direction or the strain resistance elements in the Y-axis direction, which are in the form of a membrane having an oblong planar shape, are optimized in regard to their initial resistance values. This is accomplished by suitably changing at least one element among the length dimension in the longitudinal direction, the width dimension, the depth (thickness) dimension, the concentration of the element (carrier) implanted during ion implanting, or other parameters in consideration of the crystal orientation of the semiconductor substrate, and actively changing the resistance values of the elements. The output balance across the axes can thereby be improved, and stress can be detected with high accuracy.

For example, if the strain resistance element disposed parallel to the X-axis direction (axis of the substrate that has a high resistance value) is made shorter than that of the Y-axis (axis of the substrate that has a low resistance value), it will be possible to harmonize the initial resistance values of the strain resistance elements disposed in the X-axis and Y-axis directions. For example, if the strain resistance element in the X-axis direction is made 1% shorter than the strain resistance element in the Y-axis direction, it will be possible to allow the resistance value of the element in the X-axis direction to be 1% different from that of the element in the Y-axis direction, and it will be possible to adjust the difference between the initial resistance values in the X and Y axes as caused by the crystal orientation of the substrate. It is thereby possible to adjust the resistance value of the strain resistance element in the X-axis direction and the resistance value of the strain resistance element in the Y-axis direction, and the output balance can be optimized.

The structures, shapes, sizes, and placement relationships described in the above embodiments are merely provided as schematic illustrations to allow the present invention to be understood and implemented. The values and the composition (material) of the structures are merely shown by way of example. Therefore, the present invention is not limited to the embodiments described above, and may be modified according to a variety of modes provided that no departure is made from the scope of the technical concepts indicated in the claims.

As described above, the present invention may be used to manufacture a six-axis force sensor chip that carries out temperature compensation with high accuracy and can detect stress with high accuracy when an external force or the like is applied, and can therefore be used to detect stress with high accuracy.

Obviously, various minor changes and modifications of the present invention are possible in light of the above teaching. It is therefore to be understood that within the scope of the appended claims the invention may be practiced otherwise than as specifically described.

What is claimed is:

1. A force sensor chip comprising:
   a base member having an action part including an external force action region and non-deforming regions, a support part for supporting the action part, and connecting parts disposed between the action part and the support part for connecting the action part and the support part;
   strain resistance elements provided to the connecting parts; and
   temperature-compensating resistance elements provided to the non-deforming regions of the action part in corresponding relation to respective ones of the strain resistance elements,
   wherein the action part, connecting parts and support part are separated by a plurality of slit-like holes formed in the base member,
   wherein the slit-like holes include a first bent part partly defining a portion of the connecting parts to which one of the strain resistance elements is provided and a second bent part extending in one of the non-deforming regions of the action part and located in a vicinity of one of the temperature-compensating resistance elements which is corresponding to said one strain resistance element,
   wherein a peripheral part of the connecting parts where the strain resistance elements are disposed has the same structure and temperature characteristics as that of a structure of a peripheral part of the non-deforming regions where the temperature-compensating resistance elements are disposed and
   wherein the first bent part and second bent part of the slit-like holes have the same configuration, and a positional relationship and a distance between said one strain resistance element and the first bent part of the slit-like holes are identical to those between said one temperature-compensating resistance element and the second bent part of the slit-like holes.

2. The force sensor chip of claim 1, wherein the structure of the peripheral part of the deformation-occurring parts where the strain resistance elements are disposed has the same temperature characteristics as those of the structure of the peripheral part of the non-deforming regions where the temperature-compensating resistance elements are disposed.

3. The force sensor chip of claim 1, wherein a resistance value of a wiring of the strain resistance elements and a resistance value of a wiring of the temperature-compensating resistance elements are adjusted such that resistance values relating to the strain resistance elements and resistance values relating to the temperature-compensating resistance elements are harmonized.

4. The chip of claim 3, wherein the initial resistance values of the strain resistance elements are determined by adjusting any one of the length dimension, width dimension, or depth dimension of the strain resistance elements; or the carrier concentration in the surface of the base member.

5. The force sensor chip of claim 1, wherein the first and second bent parts of the slit-like holes are oriented in the same direction.

6. The force sensor chip of claim 1, wherein the first and second bent parts of the slit-like holes are oriented in the opposite direction.

* * * * *